United States Patent Office 3,426,998
Patented Feb. 11, 1969

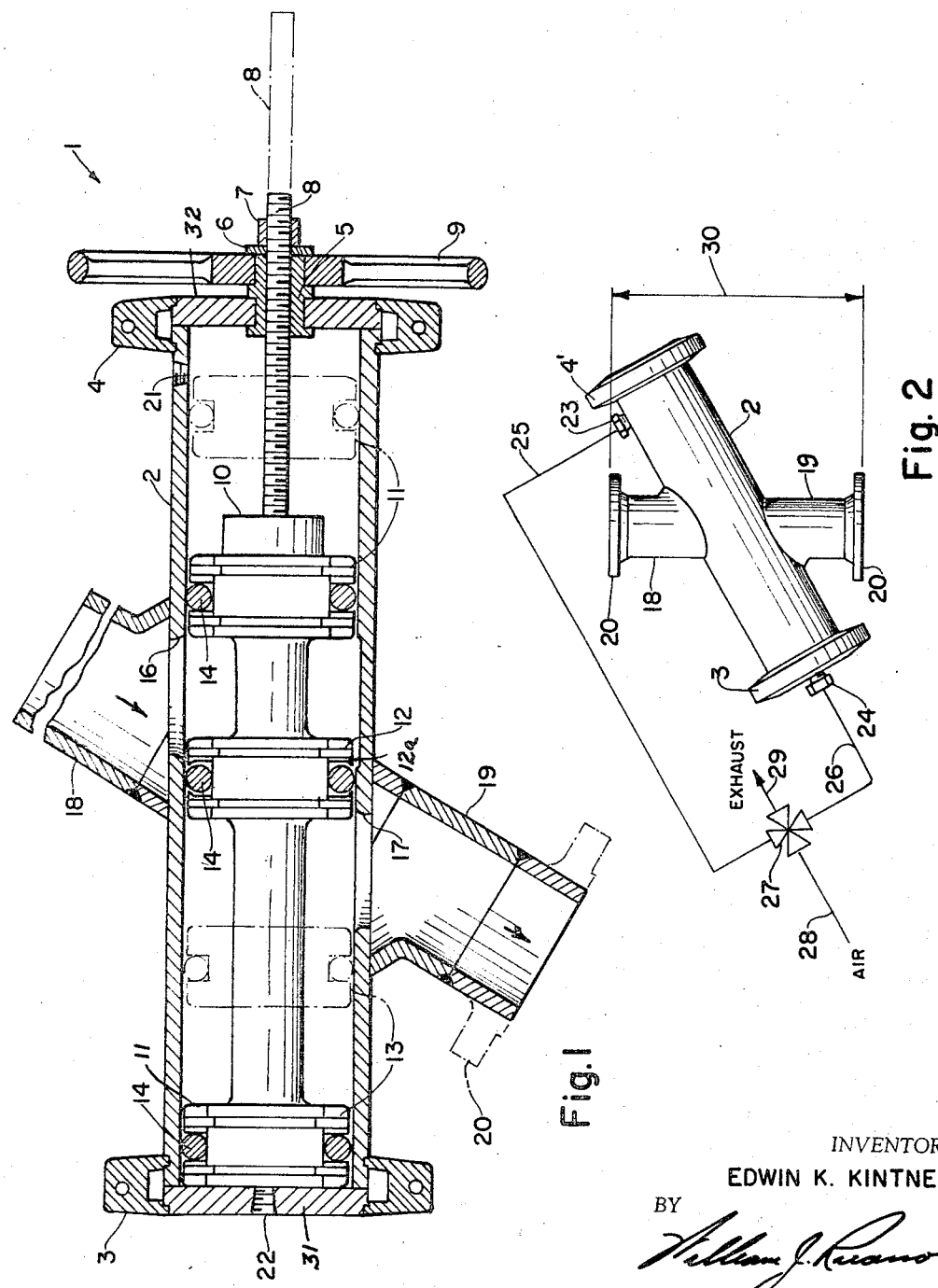

3,426,998
PISTON VALVE WITH O-RING SEAL RETAINED
BY SPLIT RING
Edwin K. Kintner, Pittsburgh, Pa., assignor to Kinwell
Development Company, Johnstown, Pa.
Filed May 25, 1967, Ser. No. 641,328
U.S. Cl. 251—324                                2 Claims
Int. Cl. F16k 9/20, 5/02, 31/43

ABSTRACT OF THE DISCLOSURE

The invention relates to a handwheel operated or automatically operated, high pressure, large flow valve having three pistons on its stem. The intermediate piston is movable across the inlet port against the incoming pressure and has an O ring of abnormal cross-section diameter of 1 inch or more and of high Durometer (about 90) and under tension. It is held in its seat by split piston rings and is partly encapsulated to resist its tendency to expand and wear through frictional contact with the inner walls of the valve body.

---

This in a continuation-in-part of application Ser. No. 402,099, filed Oct. 7, 1964.

This invention relates to a valve and, more particularly, to an automatic valve so designed as to provide a balanced piston which can be moved by application of extremely small pressures to operate the valve.

An outstanding disadvantage of conventional valves is that they involve expensive parts, such as stuffing boxes, motors, costly stems, and unreliable seats and diaphragms which have to be forced against high line pressure.

Another disadvantage is that because of the requirement of numerous parts, such valves require constant and expensive maintenance and are not truly reliable for automatic operation in control systems.

An object of the present invention is to provide an automatic valve which overcomes the above-named disadvantages of conventional valves and which eliminates the aforesaid expensive parts, such as stuffing boxes, motors, expensive stems, etc.

Another object of the present invention is to provide a valve which does not require overcoming of line pressure, which is usually high, and its attendant difficulties in maintaining the seal against such pressure and which, instead, may be moved by extremely small pressures provided either by the fluid flowing through the valve or by an external control fluid, such as air.

Other objects and advantages will become more apparent from a study of the following description taken with the accompanying drawings wherein:

FIG. 1 is a longitudinal cross-sectional view of a shutoff valve embodying the principles of the present invention; and FIG. 2 is an elevational view thereof showing control means for selectively introducing air under pressure in the respective end portions of the valve.

Referring more particularly to FIGS. 1 and 2 of the drawing, numeral 1 generally denotes an "on-off" or shut off valve embodying the principles of the present invention and comprising a valve body 2 of substantially cylindrical configuration and provided with an inlet port 18 and an outlet port 19 disposed at an angle relative to the axis of the valve body sufficiently to offset these ports longitudinally of the valve body. The outlet port may be welded to a flange or coupling element 20 shown in dash and dot outline.

The inlet opening 16 and outlet opening 17 of the valve body are of the order of about 1/3 to 1/2 of the inner diameter of the valve body 2 to permit a high volume flow, particularly at high pressures of the order of 3000 p.s.i.

The valve also includes split end caps 31 and 32 which form tight end seals by turning screw threaded couplings 3 and 4. Air may be introduced through opening 22 at one or both ends of the valve if desired.

The valve shown in FIG. 1 embodies a handwheel 9 held by lock washer 6 and threaded travel nut 7. The handwheel, when turned, propels the stem 10 longitudinally in either direction, depending upon the direction of turning of the handwheel, to open or close the valve. More specifically, the valve as shown in FIG. 1, is in the closed position. As the handwheel is turned so as to move the intermediate piston to the position shown of the piston at the extreme right (this moving the extreme left piston to the dot and dash line position), the valve will be opened so as to allow full flow from the inlet port 18 to the outlet port 19.

It should be particularly noted that the O ring 14 for sealing the intermediate piston moves across the inlet opening against the pressure of the incoming liquid (or fluid).

Standard valves are in sizes 2 to 12 inches. The 4 inch valve has a bore of 5.625 inches with a 1 inch diameter of the cross section of O ring 14. The 6 inch valve has a bore of 7.25 inches with a 1 1/8 inch diameter O ring; the 8 inch valve has 1 1/4 inch diameter; the 10 inch valve, 1 3/4 inch diameter and the 16 inch valve, 7 inch diameter. Other size valves have proportionally larger and smaller bores and O ring diameters.

The end O rings are 70 Durometer buna rubber or other suitable material. The center ring 9, in order to withstand high pressures and abrasion, is preferably 90 Durometer Polyurethane or any other suitable material. Material is available to permit these rings to withstand the heat of 2000 p.s.i. water. The end rings, when assembled, have .150 inch compression and the center ring has .100 inch compression.

The piston assembly is made of solid steel, strong enough to hold these pressures.

The central piston rings 12 are split, therefore removable and sandwiched between and fastened to solid end rings shown so that 90 Durometer rings can be initially slid into the center position. Yet when assembled, the rings 12 are strong enough to stand in shear, these high pressures. It is important that these rings have a clearance of over .015 inch so that the whole piston will not bind when these pressures are applied.

The valve body 1 is made of schedule 160 pipe and is bored. It is then either coated inside with .005 inch hard chrome, or lined with stainless steel, hard glass impregnated plastic or the like. To this body is welded ports 18 and 19 and to these ports are welded 900, 1500 or 2500 p.s.i. flanges, such as 20. The face to face dimensions are maintained the same as other standard gate valves so that they are interchangeable.

End cap 31 has a hole 22 to atmosphere so that the piston assembly can move without trapping air. A similar hole (not shown) is formed in split end cap 32.

The valve can be made automatic, as shown in FIG. 2, by removing screw 8 and by replacing split end cap 32 with a solid cap such as 31 and applying air at 100 p.s.i. to each end to selectively move the valve in opposite directions.

More specifically, air from a suitable source is introduced through line 28 to four way-two position plug valve 27, thence to exhaust 29. Thus air under pressure is selectively introduced through either line 25, through cap 23 to the right side of the piston assembly, or through line 26 and cap 24 to the left side thereof to close or open the valve, respectively.

The O ring of the intermediate piston, at least, should be slightly stretched, say about 1/8 inch in diameter when slipped onto the piston ring, so that the O ring or O rings are under tension at all times. This prevents outward expansion and attendant wear. To further assist in preventing outward expansion of the intermediate O ring, it is encapsulated as shown by the piston rings which have angular extensions 12a which partially surround the O ring so that only about 3/8 inch of the diameter of a 1 inch O ring will be exposed to high pressure, therefore will not tend to expand outwardly and be subject to excessive wear by movements of the intermediate piston across the inlet-high pressure port.

As a further aid to prevent excessive wear, an undercut 33 is provided on the inner surface of the valve body, confronting the inlet opening 16.

Another important feature of the invention is that the O rings are mounted in split rings subject only to shear forces. This makes it possible to install a 90 Durometer O ring under tension or to replace it and at the same time providing a safety factor of 5 to 1. Bolted pistons, no matter how constructed, do not give the necessary strength.

While the present valve construction is particularly suited for high pressure operation, it is also useful for low pressure valves and will provide an amazing increase in life, whether used on high or low pressures.

As pointed out above, an important requirement in high pressure operation is that the intermediate O ring be relatively large in cross section, under tension and that it moves in the direction against high inlet flow pressure as shown. If it moves into the direction of outlet flow, the velocity of the flow would tend to unseat or expand the O ring and cause abnormal wear by friction at the inner walls of the valve body.

It should be noted that the valve construction described herein may be applied to all of the different types of valves having different automatic control systems as described in my above-mentioned earlier filed application Ser. No. 402,099.

Thus it will be seen that I have provided a highly efficient shut off (or throttle) valve in which the intermediate piston and O ring move against the inlet pressure flow when moving from closed to open position, or vice versa, and which O ring has a diameter many times greater than that of conventional O rings, and which is always under tension and partially encapsulated by split piston rings to minimize its tendency to expand in diameter and cause abnormal friction with the inner wall of the valve body; also I have provided a novel valve body whose life is increased many fold as a consequence of the above-mentioned construction features.

I claim:

1. A shut-off valve for controlling high volume flow of liquid under high pressure comprising a cylinder valve body having an inlet opening at the side thereof of a diameter of between about 1/3 to 1/2 of that of the valve body and having a correspondingly sized, longitudinally spaced, outlet opening, a valve stem coaxially disposed in said valve body having three longitudinally spaced pistons rigidly secured thereto, the intermediate piston having a peripherally extending seat, an O ring having a cross section of the order of one inch in diameter of a material of about 90 Durometer hardness under tension while in said seat and projecting very slightly beyond the perimeter of said intermediate piston to form a liquid-tight seal with said valve body, said intermediate piston and O ring being movable across the entire width of only said inlet opening against the high incoming pressure thereof when moving from open to closed position so as to become confined against expansion and thus prevent abnormal wear thereof as a consequence of such movement, said intermediate piston cooperating with a seat formed on the inner wall of said valve body between said inlet and outlet openings and constituting the sole means to control the flow through said inlet port, split piston rings subject to only shear forces for holding said intermediate O ring in said intermediate piston, and means for confronting an outer surface portion of said intermediate O ring to partially encapsulate it so as to reduce its exposure to high pressure, said intermediate piston being spaced from one of said other pistons by a distance, corresponding to the combined widths of said inlet and outlet openings and being longitudinally movable by said stem to a position beyond said inlet opening so as to permit maximum flow through said inlet and outlet openings.

2. A valve as recited in claim 1 together with a handwheel outside said valve body and screw threadedly connected to said stem for moving said intermediate piston across said inlet port.

References Cited
UNITED STATES PATENTS

| | | | |
|---|---|---|---|
| 2,739,855 | 3/1956 | Bruning | 277—188 |
| 2,970,802 | 2/1961 | Ocampo | 251—324 |
| 2,995,337 | 8/1961 | Tanner | 251—324 X |
| 3,000,610 | 9/1961 | Bryant | 251—327 |
| 3,159,378 | 12/1964 | Haag | 251—63 X |

ARNOLD ROSENTHAL, *Primary Examiner.*

U.S. Cl. X.R.

251—368, 63